US008142920B2

(12) United States Patent
Hennige et al.

(10) Patent No.: US 8,142,920 B2
(45) Date of Patent: Mar. 27, 2012

(54) CERAMIC, FLEXIBLE MEMBRANE PROVIDING IMPROVED ADHESION TO THE SUPPORT FLEECE

(75) Inventors: Volker Hennige, Graz (AT); Christian Hying, Rhede (DE); Gerhard Hoerpel, Nottuln (DE)

(73) Assignee: EVONIK DEGUSSA GmbH, Essen (DE)

( * ) Notice: Subject to any disclaimer, the term of this patent is extended or adjusted under 35 U.S.C. 154(b) by 0 days.

(21) Appl. No.: 13/099,985

(22) Filed: May 3, 2011

(65) Prior Publication Data
US 2011/0206971 A1  Aug. 25, 2011

Related U.S. Application Data

(62) Division of application No. 10/575,268, filed as application No. PCT/EP2004/51842 on Aug. 19, 2004, now Pat. No. 7,959,011.

(30) Foreign Application Priority Data

Oct. 14, 2003  (DE) .................................. 103 47 569

(51) Int. Cl.
H01M 2/14 (2006.01)
B01D 39/00 (2006.01)
(52) U.S. Cl. .... 429/129; 429/144; 429/405; 210/500.25
(58) Field of Classification Search ............. 210/500.25, 210/490, 500.26; 55/524, 523; 429/129, 429/144, 405; 428/432; 427/372.2; 264/42, 264/45, 1
See application file for complete search history.

(56) References Cited

U.S. PATENT DOCUMENTS

| | | | |
|---|---|---|---|
| 5,605,628 A | 2/1997 | Davidson et al. | |
| 6,299,668 B1 | 10/2001 | Penth et al. | |
| 6,299,778 B1 | 10/2001 | Penth et al. | |
| 6,309,545 B1 | 10/2001 | Penth et al. | |
| 6,340,379 B1 | 1/2002 | Penth et al. | |
| 6,383,386 B1 | 5/2002 | Hying et al. | |
| 6,620,320 B1 | 9/2003 | Hying et al. | |
| 6,626,987 B1 | 9/2003 | Suzuki et al. | |
| 6,830,816 B2 | 12/2004 | Mehnert et al. | |
| 6,841,075 B2 | 1/2005 | Penth et al. | |
| 7,083,828 B2 | 8/2006 | Muller et al. | |
| 7,183,370 B2 | 2/2007 | Li et al. | |
| 7,504,468 B2 | 3/2009 | Guennouni et al. | |
| 7,525,788 B2 | 4/2009 | Hoerpel et al. | |
| 7,538,827 B2 | 5/2009 | Chou | |
| 7,575,832 B2 | 8/2009 | Hennige et al. | |
| 7,790,321 B2* | 9/2010 | Hennige et al. | 429/251 |
| 7,959,011 B2* | 6/2011 | Hennige et al. | 210/500.25 |
| 2002/0023419 A1 | 2/2002 | Penth et al. | |
| 2002/0039648 A1 | 4/2002 | Horpel et al. | |
| 2004/0028913 A1 | 2/2004 | Hennige et al. | |
| 2004/0038105 A1 | 2/2004 | Hennige et al. | |
| 2004/0154106 A1 | 8/2004 | Oles et al. | |
| 2004/0262169 A1 | 12/2004 | Hying et al. | |
| 2005/0031942 A1 | 2/2005 | Hennige et al. | |
| 2005/0070193 A1 | 3/2005 | Hennige et al. | |
| 2005/0084761 A1 | 4/2005 | Hennige et al. | |
| 2005/0087491 A1 | 4/2005 | Hennige et al. | |
| 2005/0103457 A1 | 5/2005 | Nun et al. | |
| 2005/0221165 A1 | 10/2005 | Hennige et al. | |
| 2005/0221192 A1 | 10/2005 | Hennige et al. | |
| 2005/0255769 A1 | 11/2005 | Hennige et al. | |
| 2006/0024569 A1 | 2/2006 | Hennige et al. | |
| 2006/0046138 A1 | 3/2006 | Hennige et al. | |
| 2006/0049376 A1 | 3/2006 | Oles et al. | |
| 2006/0078791 A1 | 4/2006 | Hennige et al. | |
| 2006/0128239 A1 | 6/2006 | Nun et al. | |
| 2006/0141223 A1 | 6/2006 | Oles et al. | |
| 2006/0156475 A1 | 7/2006 | Oles et al. | |
| 2006/0222815 A1 | 10/2006 | Oles et al. | |
| 2008/0032197 A1 | 2/2008 | Horpel et al. | |
| 2008/0190841 A1 | 8/2008 | Pascaly et al. | |
| 2008/0245735 A1 | 10/2008 | Hennige et al. | |
| 2008/0274394 A1 | 11/2008 | Schormann et al. | |

FOREIGN PATENT DOCUMENTS

| | | |
|---|---|---|
| CA | 2 477 062 | 9/2003 |
| DE | 102 08 277 | 9/2003 |
| WO | 99/15262 | 4/1999 |
| WO | 99/62624 | 12/1999 |
| WO | 03/073534 | 9/2003 |

OTHER PUBLICATIONS

Washburn, Edward W., "Note on a Method of Determining the Distribution of Pore Sizes in a Porous Material", Physics, vol. 7, pp. 115-116, 1921.
Knittel, D. et al., "Untersuchungen Zur Permanenten Oleophobausruestung—Reaktive fluorierte Verbindungen", Textilveredlung, pp. 362-363, 1998.
Meffert, A. et al., "Schnellmethode zur Bestimmung der Oberflaechengrosse feinteiliger Stoffe", pp. 187-193, 1967. (with English Translation).
International Search Report issued Nov. 16, 2004 in PCT/EP2004/051842 filed Aug. 19, 2004.

* cited by examiner

*Primary Examiner* — Ana Fortuna
(74) *Attorney, Agent, or Firm* — Oblon, Spivak, McClelland, Maier & Neustadt, L.L.P.

(57) ABSTRACT

The present invention relates to a flexible ceramic membranes which, depending on embodiment, are useful as separators for batteries, especially lithium batteries and also as a process for their production. Ceramic or hybridic membranes have the advantage that, whatever the level of flexibility already achieved, they tend to crumble of the ceramic coating on bending. this is prevented by the present membranes, which comprise, on and in a polymeric nonwoven, a solidified ceramic coating which is constructed from two fraction which metal oxide particles of different size and which adheres to the polymeric nonwoven through a network constructed by two different adhesion promoters.

13 Claims, No Drawings

CERAMIC, FLEXIBLE MEMBRANE PROVIDING IMPROVED ADHESION TO THE SUPPORT FLEECE

This application is a divisional of application Ser. No. 10/575,268, filed on Apr. 11, 2006, Now U.S. Pat. No. 7,959,011; which is a 371 of PCT?EP04/51842, filed on Aug. 19, 2004.

The present invention relates to flexible ceramic membranes with improved adhesion of the ceramic to the nonwoven base, their production and their use as a separator or as a filtration membrane in liquid filtration applications. The ceramic membranes based on ceramic-coated polymeric textiles do not detach the ceramic coating when exposed to severe mechanical stress.

An electrical separator is a membrane which is used in batteries and other arrangements in which electrodes have to be separated from each other while maintaining ion conductivity for example.

A separator is customarily a thin porous electroinsulating material possessing high ion perviousness, good mechanical strength and long-term stability to the chemicals and solvents used in the system, for example in the electrolyte of a battery. In batteries, a separator should fully electronically insulate the cathode from the anode but be pervious to the electrolyte. Moreover, a separator has to be permanently elastic and be capable of following the movements in the system, for example in the electrode pack in the course of charging and discharging.

The separator is a crucial determinant of the use life of the arrangement in which it is used, for example the use life of battery cells. The development of rechargeable batteries is therefore crucially dependent on the development of suitable separator materials.

General information about electrical separators and batteries may be gleaned for example from J. O. Besenhard in "Handbook of Battery Materials" (VCH-Verlag, Weinheim 1999).

Separators in use at present consist predominantly of porous organic polymeric films or of inorganic nonwovens such as for example nonwovens formed from glass or ceramic materials or else ceramic papers. These are manufactured by various companies. Important producers include Celgard, Tonen, Ube, Asahi, Binzer, Mitsubishi, Daramic and others. A typical organic separator consists for example of polypropylene or of a polypropylene-polyethylene-polypropylene composite.

Lithium batteries, which are widely used at the present time, are notable for many advantages, for example high specific energy density, no self-discharging and no memory effect, over systems having aqueous electrolytes, such as for example NiCd batteries or nickel metal hydride batteries. But lithium batteries have the disadvantage that they contain a combustible electrolyte which, moreover, can enter a very vigorous reaction with water. For high energy batteries, i.e., batteries containing a lot of active material, it is therefore very important that the electric circuit in the battery be interrupted in the event of an accident and an attendant heating-up of the cell. The interruption is customarily brought about by specific separators which consist of a composite comprising polypropylene(PP)-polyethylene(PE)-PP. At a certain temperature, the shutdown temperature, the PE will melt and the pores of the separator become closed, interrupting the electric circuit.

A disadvantage of these separators is their limited thermal stability, since the polypropylene will also melt as the cell continues to heat up, so that the entire separator will melt at this meltdown temperature and thus will allow internal short circuiting over a large area, which will frequently destroy the battery cell by fire or even explosion. True, there are now ceramic separators, for example ceramic papers or ceramic wovens or nonwovens, that do not exhibit the meltdown effect, but they unfortunately do not exhibit a shutdown effect either and that is indispensable for high energy applications in particular and is demanded by battery manufacturers.

Ceramic or semiceramic (hybridic) separators or ceramic membranes useful as separators are well known, for example from WO 99/15262. This reference also reveals the production of separators or membranes which are useful as separators. Preferably, however, the porous carriers used for the separators of the present invention are not electroconductive carriers such as woven metal fabrics for example, since the use of such carriers can give rise to internal short circuiting when the ceramic coating on the carrier is incomplete. Separators according to the present invention therefore preferably comprise carriers composed of nonelectroconductive materials.

A very recent development are hybridic separators which comprise ceramics and polymers. DE 102 08 277 discloses producing separators based on polymeric substrate materials (such as polymeric nonwovens for example) which have a porous electroinsulating ceramic coating. On exposure to a mechanical stress of the kind which frequently occurs in the manufacture of batteries for example, the ceramic coating will frequently become detached to some extent from these separators despite their flexibility. Batteries manufactured from these separators therefore frequently have a relatively high defect rate.

It is an object of the present invention to provide membranes useful as separators that do not exhibit any detachment of the ceramic coating on exposure to a mechanical stress of the kind occurring for example in the further processing of membranes.

It has now been found that, surprisingly, the use of a combination of at least two different adhesion promoters based on alkyltrialkoxysilanes wherein the alkyl group of one adhesion promoter comprises a substituent capable of reacting with a substituent on the alkyl group of the other adhesion promoter to form a covalent bond in the production of the ceramic coating provides a coating which is notable for distinctly improved adhesion. Surprisingly, the ceramic coatings thus produced are also very stable to the action of water, which is why the membranes thus produced can be used not only as a separator but also as a filtration membrane in liquid filtration applications.

The present invention accordingly provides a membrane based on a polymeric nonwoven, said nonwoven comprising on and in said nonwoven a ceramic coating which comprises at least one oxide selected from $Al_2O_3$, $TiO_2$, $ZrO_2$ or $SiO_2$, characterized in that this one coating comprises at least two fractions of oxides selected from $Al_2O_3$, $ZrO_2$, $TiO_2$ and/or $SiO_2$, the first ceramic fraction having been obtained from a sol and the second fraction comprising particles having an average particle size in the range from 200 nm to 5 μm and the first fraction being present as a layer on the particles of said second fraction and said first fraction comprising from 1 to 30 parts by mass of said coating, said second fraction comprising from 5 to 94 parts by mass of the ceramic coating and also a silicon network, the silicon of said network being bonded via oxygen atoms to said oxides of said ceramic coating, via organic radicals to said polymeric nonwoven and via at least one carbon chain to a further silicon.

The present invention further provides a process for producing a membrane, in particular a membrane according to the present invention, by steps which include providing a polymeric nonwoven with a ceramic coating in and on said nonwoven by a suspension being applied onto and into said polymeric nonwoven and being solidified on and in said nonwoven by heating one or more times, said suspension comprising a sol and at least one fraction of oxidic particles selected from the oxides of the elements Al, Zr, Ti and/or Si and said suspension having added to it prior to application a mixture of at least two different adhesion promoters which are each based on an alkylalkoxysilane of the general formula I

$$R_x\text{—}Si(OR)_{4-x} \tag{I}$$

where x=1 or 2 and R=organic radical, the R radicals being the same or different, said adhesion promoters being selected so that both the adhesion promoters comprise alkyl radicals which at least each comprises a reactive group as a substituent, said reactive group on said alkyl radical of one adhesion promoter reacting with said reactive group of the other adhesion promoter during the one or more heating steps to form a covalent bond, or one or more adhesion promoters as per the formula I, which have reactive groups which are capable of reacting under the action of UV radiation to form a covalent bond, the addition of an adhesion promoter which reacts under the action of UV radiation being followed by one or more treatments with UV radiation after said suspension has been applied to said polymeric nonwoven.

The present invention yet further provides for the use of membranes or separators according to the present invention as a filtration membrane or as an electrical separator, although when used as a separator the membranes are free of any titanium compounds, and also the batteries themselves which comprise such a membrane according to the present invention as a separator.

The membrane of the present invention has the advantage of a significantly higher stability in water than membranes produced using just one or more adhesion promoters where no covalent bonds were formed between the adhesion promoters. Owing to its higher stability to water, the membrane can be used not just as a separator only but also in liquid filtrations of aqueous fluids.

The production of the membrane according to the present invention by using specific adhesion promoters has advantageous repercussions for the process as well. For instance, the solidifying of the coating in the process of the present invention can take place at relatively low temperatures (drying or solidification temperature), which is why it has even become possible to produce membranes having a durable ceramic coating which are based on a polymeric substrate which have a melting or softening point of at least 120 to 150° C., such as for example polyamide, polypropylene or polyethylene.

Owing to its excellent stability to water, the membrane of the present invention can also for example be sterilized with water vapor at 120° C. under elevated pressure without the ceramic coating being damaged. On account of the good adhesion of the coating to the polymeric nonwoven on the one hand and the sterilizability on the other, the membranes according to the present invention can also be used in food filtration.

A membrane produced as described in a specific embodiment to comprise at least three fractions of metal oxides further has the advantage of being indestructible by bending, folding or crumpling once the ceramic coating has solidified on the nonwoven. The membrane is thus bendable virtually down to a bending radius of 0 mm. As a result, the membranes of the present invention have dramatically superior mechanical stability than prior art ceramic or hybridic membranes. This decisively improves the ease of handling this membrane in the course of its production but also in the course of its processing, i.e., the production of, for example, wound or stacked batteries. Batteries produced using the membranes of the present invention as separators comprise a very low defect rate.

The membranes of the present invention which are to be used as separators comprise a polymeric nonwoven having a porous inorganic nonelectroconductive coating on and in this nonwoven, and have the advantage of possessing excellent safety properties. A meltdown cannot happen with the separator of the present invention since the inorganic layer prevents large-area short circuiting within the battery even at higher temperatures.

The separator according to the present invention is also very safe in the event of internal short circuiting due to an accident for example. If, for example, a nail were to puncture the battery, the following would happen depending on the type of separator: a polymeric separator would melt at the site of puncture (a short circuiting current would flow through the nail and cause it to heat up) and contract. As a result, the short circuiting location would become larger and larger and the reaction would get out of control. With the separator according to the present invention, however, the polymeric nonwoven would melt, but not the inorganic separator material. Thus, the reaction in the interior of the battery cell would proceed much more moderately after such an accident. This battery would thus be distinctly safer than one with a polymeric separator. This is an important factor in mobile applications in particular.

The advantages of the membrane of the present invention when used as a separator in lithium ion batteries can be summarized as follows:

High porosity
Ideal pore size
Low thickness
Low basis weight
Very good wettability
High safety, i.e., no meltdown effect
Very good foldability/bendability, which is why they are particularly good for use in very narrowly wound lithium batteries, especially crashed cells.

The membrane of the present invention and a process for producing it will now be described without the invention intending to be limited to these embodiments.

The inventive membrane based on a polymeric nonwoven, the nonwoven comprising on and in the nonwoven at least one ceramic coating which comprises at least one oxide selected from $Al_2O_3$, $TiO_2$, $ZrO_2$ or $SiO_2$, is characterized in that this one coating comprises at least two fractions of oxides selected from $Al_2O_3$, $ZrO_2$, $TiO_2$ and/or $SiO_2$, the first ceramic fraction having been obtained from a sol and the second fraction comprising particles having an average particle size in the range from 200 nm to 5 μm and the first fraction being present as a layer on the particles of said second fraction and said first fraction comprising from 1 to 30 parts by mass of said coating, said second fraction comprising from 5 to 94 parts by mass of the ceramic coating and also a silicon network, the silicon of said network being bonded via oxygen atoms to said oxides of said ceramic coating, via organic radicals to said polymeric nonwoven and via at least one carbon chain to a further silicon. The carbon chain preferably comprises at least one nitrogen atom as well as carbon atoms. Preferably, the inventive membrane comprises a silicon network wherein the chains by which the silicon atoms are connected to each other via carbon atoms, through silicon atoms connected by chains comprising nitrogen, was obtained by addition of an amino group onto a glycidyl group. Owing to these chains between the silicon atoms, there is not only an inorganic network formed via Si- or metal-oxygen bridges but also a second, organic network which is reticulated with the first, inorganic network and which significantly augments the stability of the membrane, especially against water. When the inventive membrane is to be used as a separator, the membrane is free of any titanium compounds ($TiO_2$) but comprises, especially as particles or as a sol, only $SiO_2$, $Al_2O_3$ and/or $ZrO_2$.

Depending on the embodiment of the membrane of the present invention, it can comprise particles as a first ceramic fraction, especially particles having an average particle size of less than 20 nm. Such a ceramic fraction can have been produced via a particulate sol for example. In another preferred embodiment of the membrane according to the present invention, the ceramic fraction contains particles or a polymerlike inorganic network which were produced via a polymeric sol. The ceramic fraction has a layer thickness on the surface of the particles of the second fraction which is preferably less than 100 nm and more preferably less than 50 nm. The second fraction of particles preferably has a BET surface area of less than 5 $m^2/g$.

The membranes of the present invention preferably comprise polymeric nonwovens which are flexible and preferably less than 50 μm in thickness and less than 25 $g/m^2$ in basis weight. The flexibility of the nonwoven ensures that the membrane of the present invention can be flexible as well.

The high flexibility of the membranes according to the invention, then, also makes it possible to use these as separators in wound cells which have a small winding radius of less than 0.5 mm.

The thickness of the nonwoven has a significant bearing on the properties of the membrane, especially on the properties of a membrane used as a separator, since not only the flexibility but also the sheet resistance of the electrolyte-saturated separator is dependent on the thickness of the nonwoven. The membrane of the present invention therefore preferably comprises nonwovens which are less than 30 μm and especially from 10 to 20 μm in thickness. The membrane of the present invention more preferably comprises nonwovens having a basis weight of less than 20 $g/m^2$ and especially in the range from 5 to 15 $g/m^2$. To be able to achieve sufficiently high battery performance, especially in the case of lithium ion batteries, it has been determined to be advantageous for the membrane of the present invention to comprise a carrier whose porosity is preferably above 50%, more preferably in the range from 50% to 97%, even more preferably in the range from 60% to 90% and most preferably in the range from 70% to 90%. Porosity in this context is defined as the volume of the nonwoven (100%) minus the volume of the fibers of the nonwoven, i.e., the fraction of the volume of the nonwoven that is not taken up by material. The volume of the nonwoven can be calculated from the dimensions of the nonwoven. The volume of the fibers is calculated from the measured weight of the nonwoven in question and the density of the polymeric fibers. A very homogeneous pore radius distribution in the nonwoven can be important for the use in an inventive membrane, especially separator. A very homogeneous pore radius distribution in the nonwoven can, in conjunction with optimally adapted oxide particles of a certain size, lead to an optimized porosity for the membrane of the present invention, especially with regard to use as a separator. Preferably, the inventive membrane, especially for membranes to be used as a separator, therefore comprises a nonwoven which has a pore radius distribution where at least 50% of the pores have a pore radius in the range from 100 to 500 μm.

The polymeric fibers of the nonwoven preferably comprise nonelectroconductive fibers of polymers which are preferably selected from polyacrylonitrile (PAN), polyester, for example polyethylene terephthalate (PET), polyamide (PA), for example nylon 12 or polyolefins, for example polypropylene (PP) or polyethylene (PE). More preferably, the nonwoven comprises polymeric fibers composed of polyester, especially PET, and/or polyamide, especially nylon 12, or consists fully of these polymeric fibers. The polymeric fibers of the nonwovens are preferably from 0.1 to 10 μm and more preferably from 1 to 5 μm in diameter.

In a preferred embodiment of the membrane according to the present invention, the coating comprises at least three fractions of oxides selected from $Al_2O_3$, $ZrO_2$, $TiO_2$ and/or $SiO_2$, said third fraction comprising particles having an average primary particle size in the range from 10 nm to 199 nm and said first fraction being present as a layer on said particles of said second and third fractions and said first fraction comprising from 1 to 30 parts by mass of said ceramic coating, said second fraction comprising from 30 to 94 parts by mass of said ceramic coating and said third fraction comprising from 5 to 50 parts by mass of said ceramic coating.

In this preferred embodiment, the large particles (second fraction) serve as a filling material for the large meshes in the carrier. The first ceramic fraction serves as an inorganic binder which fixes the particles to each other and also to the nonwoven (or, to be more specific, to the inorganic silicon network formed by the adhesion promoters). The inorganic network ensures particularly good adhesion of the ceramic coating to the polymeric nonwoven. The particles of the third fraction, which have a particle size in the middle, are believed to be responsible for the particularly good flexibility.

The membrane of the present invention more preferably comprises a coating where the third fraction comprises particles having an average primary particle size in the range from 30 nm to 60 nm and said second fraction comprises particles having an average particle size in the range from 1 to 4 μm and said first fraction comprises from 10 to 20 parts by mass of said ceramic coating, said third fraction comprises from 10 to 30 parts by mass of said ceramic coating and said second fraction comprises from 40 to 70 parts by mass of said ceramic coating.

It may be preferable for the third particle fraction to contain particles which have an average aggregate or agglomerate size in the range from 1 to 25 μm. Preferably, the third (particle) fraction contains particles which have a BET surface area in the range from 10 to 1,000 and preferably in the range from 40 to 100 $m^2/g$.

Particularly good flexibility can be achieved for the membrane of the present invention when the particles of the third fraction are zirconium oxide or preferably silicon oxide particles and the particles of the second fraction are aluminum oxide particles and the ceramic fraction is formed from silicon oxide. The medium particles (third fraction, for example Sipernat, Aerosil or VP Zirkoniumoxid, all Degussa AG) and large particles (second fraction, for example the aluminas CT800SG, AlCoA, and MZS, Martinswerke) are commercially available. The first ceramic fraction comes from sols, which are likewise commercially available or have to be produced themselves.

The membranes of the present invention are bendable without damage preferably down to any radius down to 50 m, preferably 10 cm and more preferably 5 mm without defects arising in the coating as a result. The membranes of the present invention are also notable for a breaking strength of at least 1 N/cm, preferably of at least 3 N/cm and most preferably of above 6 N/cm.

Membranes according to the present invention which comprise the abovementioned three fractions in the specified mass ranges may be even more flexible. These inventive membranes are bendable without damage preferably down to any radius down to 100 m, preferably down to a radius in the range from 100 m to 5 mm, more preferably down to a radius in the range from 5 to 0.5 mm, more preferably down to 0.1 mm and most preferably down to 0.01 mm without defects arising as a result. More particularly, the membranes of the present invention can be folded in the same way as, for example, cloths without the ceramic coating becoming detached. The high breaking strength and the good bendability of the membrane according to the present invention has the advantage that, when the membrane is used as a separator, the separator is able to keep up with electrode geometry changes occurring in the course of the charging and discharging of the battery without the separator becoming damaged. The bendability, moreover, has the advantage that commercially standardized wound cells can be manufactured using this separator. With these cells, the electrode-separator plies are spirally wound up with each other in standardized size and contacted.

A membrane according to the present invention which is to be used as a separator may preferably have a porosity in the range from 30% to 80%. Porosity here refers to the accessible, i.e., open, pores. Porosity in this sense can be determined by the familiar method of mercury porosimetry or can be calculated from the volume and the density of the ingredients used on the assumption that open pores only are present. By average pore size and the porosity are meant the average pore size and the porosity as may be determined by the known method of mercury porosimetry using for example a 4000 Porosimeter from Carlo Erba Instruments. Mercury porosimetry is based on the Washburn equation (E. W. Washburn, "Note on a Method of Determining the Distribution of Pore Sizes in a Porous Material", *Proc. Natl. Acad. Sci.*, 7, 115-116 (1921)).

When the membrane is used as a separator, it may further be advantageous for a shutdown function to be present. For this purpose, shutdown particles or a layer of shutdown particles can be present on the ceramic layer. Such shutdown particles can be for example natural or artificial waxes, (low-melting) polymers, for example polyolefins or mixtures thereof, in which case the material for the shutdown particles is chosen so that the particles will melt at a desired shutdown temperature and close the pores of the separator (membrane) to prevent any further ion flux. It is particularly preferable for the inventive membrane for use as a separator with shutdown function to comprise shutdown particles composed of polyethylene (wax).

The size of the shutdown particles is freely choosable in principle as long as it is ensured that the pores in the inorganic layer do not become clogged during the production of the separator (membrane) of the present invention. Preferably, the shutdown particles have an average particle size ($D_w$) which is greater than the average pore size ($d_s$) of the pores in the inorganic layer. More preferably, the shutdown particles have an average particle size ($D_w$) which is greater than the average pore size ($d_s$) and less than 5 $d_s$ and more preferably less than 2 $d_s$. This is advantageous in particular because this prevents penetration and closing of the pores in the inorganic layer that would result in a reduction in ion flow and hence in reduced separator conductivity and also reduced battery performance. The thickness of the shutdown particle layer is only critical insofar as an excessively thick layer would unnecessarily increase the resistance in the battery system. To achieve safe shutdown, the shutdown particle layer should have a thickness ($z_w$) which is approximately in the range from the average particle size of the shutdown particles ($D_w$) up to 10 $D_w$ and preferably in the range from less than 2 $D_w$ to more than 1 $D_w$.

The inventive membranes/separators having a shutdown function are preferably less than 50 µm, more preferably less than 40 µm and even more preferably from 5 to 35 µm in thickness. Without shutdown particles, the separator of the present invention is preferably from 15 to 50 µm and preferably from 20 to 30 µm in thickness. Separator thickness has a large bearing on separator properties, since not only the flexibility but also the sheet resistance of the electrolyte-saturated separator is dependent on the thickness of the separator. The low thickness ensures a particularly low electrical resistance for the separator in use with an electrolyte. The separator itself does of course have a very high electrical resistance, since it itself has to have insulating properties. Moreover, thinner separators permit an increased pack density in a battery stack, so that a larger amount of energy can be stored in the same volume.

The separators of the present invention are preferably obtainable by the process of the present invention. The process for producing a membrane, in particular a membrane according to the present invention, comprises providing a polymeric nonwoven with a ceramic coating in and on said nonwoven by a suspension being applied onto and into said polymeric nonwoven and being solidified on and in said nonwoven by heating one or more times, said suspension comprising a sol and at least one fraction of oxidic particles selected from the oxides of the elements Al, Zr, Ti and/or Si and said suspension having added to it prior to application a mixture of at least two different adhesion promoters which are each based on an alkylalkoxysilane of the general formula I

$$R_x\text{—Si(OR)}_{4-x} \qquad (I)$$

where x=1 or 2 and R=organic radical, the R radicals being the same or different,
said adhesion promoters being selected so that both the adhesion promoters comprise alkyl radicals which at least each comprises a reactive group as a substituent, said reactive group on said alkyl radical of one adhesion promoter reacting with said reactive group of the other adhesion promoter during the one or more heating steps to form a covalent bond, or one or more adhesion promoters as per the formula I, which have reactive groups which are capable of reacting under the action of UV radiation to form a covalent bond, the addition of an adhesion promoter which reacts under the action of UV radiation being followed by one or more treatments with UV radiation after said suspension has been applied to said polymeric nonwoven. The treatment with UV radiation can be effected for example by means of a UV lamp, in which case the amount of energy received has to be sufficient to ensure crosslinking of the adhesion promoters. An appropriate treatment can be effected for example by irradiation with a mercury vapor lamp having a wavelength of 254 nm for 0.1 to 24 hours and preferably 1 to 4 hours. The treatment with UV radiation can take place before or after the at least single heating. Preferably, the UV treatment is carried out after the suspension has been applied to the polymeric nonwoven and before the single heating of the suspension to solidify the same. It is particularly preferable for the treatment with UV radiation to be carried out after a first heating of the suspension applied to the polymeric nonwoven to predry the suspension and before a second heating to solidify the suspension. The predrying can take place for example at a temperature in the range from 50 to 90° C., preferably from 60 to 85° C. and preferably for a period in the range from 0.1 to 3 hours and preferably in the range from 0.5 to 1.5 hours.

The use of at least two of the adhesion promoters mentioned is believed to lead to the formation, during the production of the membrane, of a network which comprises silicon, the silicon of the network being bonded via oxygen atoms to the oxides of the ceramic coating, via organic radicals to the polymeric nonwoven and via at least one chain comprising carbon atoms to a further silicon. It is believed that the same effect is achieved through an at least single treatment with UV radiation when a UV-active adhesion promoter is added to the suspension. Owing to the chains between the silicon atoms, there is not only an inorganic network, formed via Si- or metal-oxygen bridges, but also a second, organic network which is reticulated with the first, inorganic network and which significantly augments the stability of the membrane, especially against water.

Useful adhesion promoters include in principle all adhesion promoters which satisfy the abovementioned formula I and where at least two adhesion promoters each have an alkyl radical which is capable of entering into a chemical reaction with the alkyl radical of the other adhesion promoter to form a covalent bond. In principle, all chemical reactions are feasible, but an addition or condensation reaction is preferable. The adhesion promoters may each have two or one alkyl radical (x in formula I being 1 or 2). Preferably, the adhesion promoters used in the process according to the present invention which have a reactive group on the alkyl radical have only one alkyl radical (x=1). The at least two adhesion promoters employed in the process of the present invention can be for example an adhesion promoter having an amino group on the alkyl radical and an adhesion promoter having a glycidyl group on the alkyl radical. It is particularly preferable for the process of the present invention to employ 3-aminopropyltriethoxysilane (AMEO) and 3-glycidyloxytrimethoxysilane (GLYMO) as adhesion promoters. Preferably, the molar ratio of the two adhesion promoters to each other is in the range from 100:1 to 1:100 and preferably in the range from 2:1 to 1:2 and most preferably about 1:1. Methacryloyloxypropyltrimethoxysilane (MEMO) is preferably used as a UV-active adhesion promoter which is capable of forming a covalent bond between the adhesion promoter molecules under the action of UV radiation. The adhesion promoters are available from Degussa AG for example.

To obtain a sufficiently stable network, the suspension of the present invention preferably comprises an adhesion promoter fraction in the range from 0.1 to 20 mass % and preferably in the range from 2 to 10 mass %. As well as the "reactive" adhesion promoters mentioned, the suspension may comprise further adhesion promoters selected from the organofunctional silanes. These adhesion promoters can likewise be present in the suspension at a fraction in the range from 0.1 to 20 mass % and preferably at a fraction in the range from 2 to 10 mass %.

When the membrane produced using a process of the present invention is to be used as a separator, no electrically conducting compounds and especially no titanium compounds are used in the production of the membrane.

Examples of ways in which the suspension can be applied onto and into the nonwoven in a process of the present invention include printing on, pressing on, pressing in, rolling on, knifecoating on, spreadcoating on, dipping, spraying or pouring on.

The nonwoven used is preferably less than 30 µm, more preferably less than 20 µm and even more preferably from 10 to 20 µm in thickness. It is particularly preferable to use nonwovens as described in the description of the membrane according to the present invention. It may be preferable for the polymeric fibers to be from 0.1 to 10 µm and preferably from 1 to 5 µm in diameter. It is particularly preferable to use a polymeric nonwoven which comprises fibers selected from polyacrylonitrile, polyester, polyimide, polyamide, polytetrafluoroethylene and/or polyolefin, for example polyethylene or polypropylene. More particularly, the polymeric nonwoven used will comprise fibers selected from polyester, especially polyethylene terephthalate, and/or polyamide, especially nylon 12.

The suspension used for producing the coating comprises at least the abovementioned fraction of at least one oxide of aluminum, of silicon, of titanium and/or of zirconium and at least one sol of the elements Al, Zr, Ti and/or Si and is prepared by suspending at least the particles of the second fraction in at least one of these sols. The suspension may comprise particulate or polymeric sols. Preferably, the suspension comprises a polymeric sol, especially a polymeric sol of a silicon compound.

The sols are obtained by hydrolyzing at least one precursor compound of the elements Zr, Al, Ti and/or Si with water or an acid or a combination thereof. It may similarly be preferable for the compound to be hydrolyzed to be introduced into alcohol or an acid or a combination thereof prior to hydrolysis. Preferably, the compounds to be hydrolyzed are present dissolved in an anhydrous solvent, preferably alcohol, and are hydrolyzed with from 0.1 to 100 times and preferably from 1 to 5 times the molar ratio of water.

The compound to be hydrolyzed is preferably at least one nitrate, one halide (chloride), one carbonate or one alkoxide compound of the elements Zr, Al and/or Si, preferably Si. More preferably, the compounds to be hydrolyzed are alkoxysilanes, especially tetraethoxysilane (TEOS). The hydrolysis is preferably carried out in the presence of liquid water, water vapor, ice or an acid or a combination thereof.

In one embodiment of the process according to the present invention, particulate sols are prepared by hydrolysis of the compounds to be hydrolyzed. These particulate sols are so called because the compounds formed by hydrolysis in the sol are present in particulate form. Particulate sols can be prepared as described above or in WO 99/15262. These sols customarily have a very high water content, which is preferably above 50% by weight. It may be preferable for the compound to be hydrolyzed to be introduced into alcohol or an acid or a combination thereof prior to hydrolysis. The hydrolyzed compound may be peptized by treatment with at least one organic or inorganic acid, preferably with a 10-60% organic or inorganic acid, more preferably with a mineral acid selected from sulfuric acid, hydrochloric acid, perchloric acid, phosphoric acid and nitric acid or a mixture thereof.

In a further embodiment of the process according to the present invention, polymeric sols are prepared by hydrolysis of the compounds to be hydrolyzed. Polymeric sols are so called because the compounds formed by hydrolysis in the sol are present in polymeric form, i.e., in the form of chains crosslinked across a relatively large space. Polymeric sols customarily contain less than 50% by weight and preferably much less than 20% by weight of water and/or aqueous acid. To obtain the preferred fraction of water and/or aqueous acid, the hydrolysis is preferably carried out in such a way that the compound to be hydrolyzed is hydrolyzed with from 0.5 to 10 times the molar ratio and preferably with half the molar ratio of liquid water, water vapor or ice, based on the hydrolyzable group of the hydrolyzable compound. The amount of water used can be up to 10 times in the case of compounds which are very slow to hydrolyze, such as tetraethoxysilane for example. A hydrolysis with less than the preferred amount of liquid water, water vapor or ice likewise leads to good results, although using more than 50% less than the preferred amount of half the molar ratio is possible but not very sensible, since hydrolysis would no longer be complete and coatings based on such sols would not be very stable using an amount below this value.

To prepare these sols having the desired very low fraction of water and/or acid in the sol, it is preferable for the compound to be hydrolyzed to be dissolved in an organic solvent, especially ethanol, isopropanol, butanol, amyl alcohol, hexane, cyclohexane, ethyl acetate or mixtures thereof, before the actual hydrolysis is carried out. A sol thus produced can be used for producing the suspension of the present invention or else as an adhesion promoter in a pretreatment step.

Both particulate sols and polymeric sols are useful as a sol in the process for preparing the suspension. As well as sols obtainable as just described, it is in principle also possible to use commercially available sols, for example silica sols (such as, say, Levasil, Bayer AG). The process of producing membranes which are particularly useful in the process of the present invention by applying a suspension to, and solidifying it on, a carrier is known per se from DE 10142622 and in similar form from WO 99/15262, but not all the parameters and ingredients are applicable to the production of the membrane produced in the process of the present invention. More particularly, the operation described in WO 99/15262 is in that form not fully applicable to polymeric nonwoven materials, since the very watery sol systems described therein frequently do not permit complete, in-depth wetting of the customarily hydrophobic polymeric nonwovens, since most polymeric nonwovens are only badly wetted by very watery sol systems, if at all. It has been determined that even the minutest unwetted areas in the nonwoven material can lead to membranes and separators being obtained that have defects (such as holes or cracks, for example) and hence are inutile.

It has been found that a sol system or suspension whose wetting behavior has been adapted to the polymers will completely penetrate the carrier materials and especially the nonwoven materials and so provide defect-free coatings. In the process it is therefore preferable to adapt the wetting behavior of the sol or suspension. This is preferably accomplished by producing polymeric sols or suspensions from polymeric sols, these sols comprising one or more alcohols, for example, methanol, ethanol or propanol or mixtures comprising one or more alcohols and also preferably aliphatic hydrocarbons. But other solvent mixtures are conceivable as well for addition to the sol or suspension in order that the wetting behavior thereof may be adapted to the nonwoven used.

It has been determined that the fundamental change to the sol system and to the suspension resulting therefrom leads to a distinct improvement in the adhesion properties of the ceramic components on the and in a polymeric nonwoven material. Such good adhesive strengths are normally not obtainable with particulate sol systems. It is therefore preferable for the nonwovens which are used in the invention, which comprise polymeric fibers, to be coated by means of suspensions which are based on polymeric sols.

It is particularly preferable to use suspensions where the mass fraction of the suspended component is from 1.5 to 150 times and more preferably from 5 to 20 times the employed fraction from the sol. The suspended component used may be in particular aluminum oxide particles which are available for example from Martinswerke under the designations MZS 3 and MZS1 and from AlCoA under the designation CT3000 SG, CL3000 SG, CT1200 SG, CT800SG and HVA SG.

A preferred embodiment of the process according to the present invention utilizes a suspension which comprises a sol and at least two fractions of oxidic particles selected from the oxides of the elements Al, Zr, Ti and/or Si and at least one first fraction comprises primary particles having an average particle size in the range from 200 nm to 5 µm and comprises from 30 to 94 parts by mass of said suspension and at least one second fraction has an average primary particle size in the range from 10 nm to 199 nm and comprises from 5 to 50 parts by mass of said suspension. The particles of the first fraction are preferably aluminum oxide particles and are available for example from Martinswerke under the designations MZS 3 and MZS1 and from AlCoA under the designation CT3000 SG, CL3000 SG, CT1200 SG, CT800SG and HVA SG. Aluminum oxide, silicon oxide or zirconium oxide particles of the second fraction are obtainable for example from Degussa AG under the designations Sipernat, Aerosil, Aerosil P25 or Zirkoniumoxid VP.

It has been determined that the use of commercially available oxidic particles leads to unsatisfactory results in certain circumstances, since the particle size distribution is frequently very wide. It is therefore preferable to use metal oxide particles which have been classified by a conventional process, for example wind sifting and hydroclassification.

To improve the adhesion of the inorganic components to polymeric fibers or nonwovens, but also to improve the adhesion of the shutdown particles to be applied later, it may be preferable for the suspensions used to be admixed with further adhesion promoters, for example organofunctional silanes, for example the Degussa silanes AMEO (3-aminopropyltriethoxysilane), GLYMO (3-glycidyloxytrimethoxysilane), MEMO (3-methacryloyloxypropyltrimethoxysilane), Silfin (vinylsilane+initiator+catalyst), VTEO (vinyltriethoxysilane). The admixing of adhesion promoters is preferable in the case of suspensions based on polymeric sols. Useful adhesion promoters include in general terms especially compounds selected from the octylsilanes, the vinylsilanes, the amine-functionalized silanes and/or the glycidyl-functionalized silanes. Particularly preferred adhesion promoters are amine-functional silanes for polyamides and glycidyl-functionalized silanes for polyesters. Other adhesion promoters can be used as well, but they have to be adapted to the respective polymers. Adhesion promoters have to be chosen such that the solidification temperature is below the melting or softening temperature of the polymer used as a substrate and below the decomposition temperature of the polymer. Preferably, suspensions according to the present invention contain very much less than 25% by weight and preferably less than 10% by weight of compounds capable of acting as adhesion promoters. An optimal fraction of adhesion promoter results from coating the fibers and/or particles with a monomolecular layer of adhesion promoter. The amount in grams of adhesion promoter required for this purpose can be obtained by multiplying the amount (in g) of the oxides or fibers used by the specific surface area of the materials (in $m^2\ g^{-1}$) and then dividing by the specific area required by the adhesion promoters (in $m^2\ g^{-1}$), the specific area required frequently being in the range from 300 to 400 $m^2\ g^{-1}$ in order of magnitude.

The suspension present on and in the polymeric nonwoven as a result of having been applied thereto can be solidified by heating to a temperature in the range from 50 to 350° C. for example. Since, when polymeric materials are used, the maximum allowable temperature is dictated by the softening/melting temperature of this material, the maximum allowable temperature has to be adapted accordingly. Thus, depending on the embodiment of the process, the suspension present on and in the nonwoven is solidified by heating at from 100 to 350° C. and most preferably by heating at from 200 to 280° C. It may be preferable for the heating to take place at from 150 to 350° C. for from 1 second to 60 minutes. It is particularly preferable to solidify the suspension by heating at from 110 to 300° C. and most preferably at from 170 to 220° C. and preferably for from 0.5 to 10 min. The solidifying by heating the suspension preferably takes from 0.5 to 10 minutes at from 200 to 220° C. on a polymeric nonwoven comprising fibers composed of polyester, especially PET, from 0.5 to 10 minutes at from 130 to 180° C. on a polymeric nonwoven comprising fibers composed of polyamide, especially nylon 12, and from 0.5 to 10 minutes at from 100 to 140° C. on a polymeric nonwoven comprising fibers composed of polyethylene. The heating of the assembly may be effected by means of heated air, hot air, infrared radiation or by other heating methods according to the prior art.

The process for producing the membranes of the present invention can be carried out for example by unrolling the nonwoven off a reel, passing it at a speed in the range from 1 m/h to 2 m/s, preferably at a speed in the range from 0.5 m/min to 20 m/min and most preferably at a speed in the range from 1 m/min to 5 m/min through at least one apparatus which applies the suspension onto and into the nonwoven, for example a roll, a sprayer or a coating knife, and at least one further apparatus which enables the suspension to be solidified on and in the nonwoven by heating, for example an electrically heated furnace, and rolling the membrane thus produced up on a second reel. This makes it possible to produce the membrane in a continuous process.

When the membrane of the present invention is to be used as a separator and when this separator is to have a shutdown function, particles having a defined, desired melting temperature can be applied to and fixed on the porous ceramic layer as shutdown particles.

In one embodiment of the process according to the present invention, it will be advantageous for the porous inorganic layer to be hydrophobicized before the shutdown particles are applied to it. The production of hydrophobic membranes which may serve as a starting material for producing the separators of the present invention is described for example in WO 99/62624. Preferably, the porous inorganic layer is hydrophobicized by treatment with alkyl-, aryl- or fluoroalkylsilanes marketed for example by Degussa under the trade name of Dynasilan. It is possible in this context to employ for example the familiar hydrophobicization methods which are employed inter alia for textiles (*D. Knittel; E. Schollmeyer; Melliand Textilber*. (1998) 79(5), 362-363), with minimal changes to the recipes, for porous permeable composites produced for example by the process described in PCT/EP98/05939. To this end, a permeable composite material (membrane or separator) is treated with a solution which comprises at least one hydrophobic material. It may be preferable for the solvent in the solution to be water, preferably adjusted to a pH in the range from 1 to 3 with an acid, preferably acetic acid or hydrochloric acid, and/or an alcohol, preferably ethanol. The solvent fraction attributable to acid-treated water or to alcohol may in each case be in the range from 0% to 100% by volume. Preferably, the fraction of the solvent which is attributable to water is in the range from 0% to 60% by volume and the fraction of solvent which is attributable to alcohol is in the range from 40% to 100% by volume. The solvent has introduced into it from 0.1 to 30% by weight and preferably from 1% to 10% by weight of a hydrophobic material to prepare the solution. Useful hydrophobic materials include for example the silanes recited above. Surprisingly, good hydrophobicization is obtained not just with strongly hydrophobic compounds such as for example triethoxy(3,3,4,4,5,5,6,6,7,7,8,8-tridecafluorooctyl)silane, but a treatment with methyl-triethoxysilane or i-butyltriethoxysilane is completely sufficient to obtain the desired effect. The solutions are stirred at room temperature to achieve uniform dissipation of the hydrophobic materials in the solution and are subsequently applied to the porous inorganic layer and dried. The drying can be speeded by a treatment at temperatures in the range from 25 to 100° C.

In a further version of the process according to the present invention, the porous inorganic layer can also be treated with other adhesion promoters before the shutdown particles are applied to it. The treatment with one of the adhesion promoters mentioned can then likewise be effected as described above, i.e., by treating the porous inorganic layer with a polymeric sol which comprises a silane adhesion promoter. More particularly, the treatment can be effected by using adhesion promoters in the production of the separator as described above.

The layer of shutdown particles is preferably produced by applying a suspension of shutdown particles in a suspension medium selected from a sol, water or solvent, for example alcohol, hydrocarbons, ethers or ketones or a solvent mixture. The particle size of the shutdown particles present in the suspension is freely choosable in principle. However, it is advantageous for the suspension to contain shutdown particles having an average particle size ($D_w$) which is greater than the average pore size of the pores in the porous inorganic layer ($d_s$), since this ensures that the pores in the inorganic layer are not clogged by shutdown particles in the course of the production of the separator according to the present invention. The shutdown particles used preferably have an average particle size ($D_w$) which is greater than the average pore diameter ($d_s$) and less than 5 $d_s$ and more preferably less than 2 $d_s$.

The solvent used for the dispersion is preferably water. These aqueous dispersions are adjusted to a polymer or wax content in the range from 1% to 60%, preferably from 5% to 50% and most preferably from 20% to 40% by weight. When water is used as a solvent, it is very simple to obtain in the dispersion the preferred average particle sizes from 1 to 10 μm which are very highly suitable for the separators of the present invention.

Using a nonaqueous solvent for producing the wax or polymer dispersion is a preferable way of obtaining average particle sizes of less than 1 μm in the dispersion. It is similarly possible to use mixtures of nonaqueous solvents with water.

To employ shutdown particles smaller in size than the pores in the porous inorganic layer, the particles must be prevented from penetrating into the pores in the porous inorganic layer. Reasons for using such particles can reside for example in large price differences but also in the availability of such particles. One way of preventing the penetration of shutdown particles into the pores in the porous inorganic layer is to adjust the viscosity of the suspension such that absent external shearing forces no penetration of the suspension into the pores in the inorganic layer takes place. Such a high viscosity for the suspension is obtainable for example by adding auxiliaries which influence the flow behavior, for example silicas (Aerosil, Degussa), to the suspension. When auxiliaries are used, for example Aerosil 200, a fraction from 0.1% to 10% by weight and preferably from 0.5 to 50% by weight of silica, based on the suspension, will frequently be sufficient to achieve a sufficiently high viscosity for the suspension. The fraction of auxiliaries can in each case be determined by simple preliminary tests.

It may be preferable for the shutdown particle suspension used to contain adhesion promoters. Such a suspension with adhesion promoter can be applied directly to a membrane/separator even when the separator was not hydrophobicized beforehand. It will be appreciated that a suspension with adhesion promoter can also be applied to a hydrophobicized membrane or to a membrane which has been produced using an adhesion promoter. Adhesion promoters used in the shutdown particle suspension are preferably silanes having amino, vinyl or methacryloyl side groups. Such silanes are obtainable for example from Degussa as pure products or as aqueous solutions of the hydrolyzed silane under for example the designation Dynasilan 2926, 2907 or 2781. An adhesion promoter fraction of not more than 10% by weight in the suspension has been determined to be sufficient for ensuring sufficient adhesion of the shutdown particles to the porous inorganic coating. Shutdown particle suspensions with adhesion promoter preferably contain from 0.1% to 10% by weight, more preferably from 1% to 7.5% by weight and most preferably from 2.5% to 5% by weight of adhesion promoter, based on the suspension.

Useful shutdown particles include all particles having a defined melting point. The particle material is chosen according to the shutdown temperature desired. Since relatively low shutdown temperatures are desired for most batteries, it is advantageous to use shutdown particles selected from particles of polymers, polymer blends, natural and/or artificial waxes. Particularly preferred shutdown particles are particles of polypropylene wax or particles of polyethylene wax.

The shutdown particle suspension may be applied to the porous inorganic layer by printing on, pressing on, pressing in, rolling on, knifecoating on, spreadcoating on, dipping, spraying or pouring on. The shutdown layer is preferably obtained by drying the applied suspension at a temperature in the range from room temperature to 100° C. and preferably in the range from 40 to 60° C. The drying operation has to be carried out in such a way that the shutdown particles do not melt.

It may be preferable for the shutdown particles to be fixed after they have been applied to the porous ceramic coating, by heating one or more times to a temperature above the glass transition temperature, so that the particles are fused on without undergoing a change in their actual shape. This makes it possible to ensure that the shutdown particles adhere particularly firmly to the porous inorganic layer.

The applying of the suspension with subsequent drying and any heating to above the glass transition temperature can be carried out continuously or quasi continuously, equivalently to the production of the separator itself, by the separator again being unwound off a reel, led through a coating, drying and, if appropriate, heating apparatus and then rolled up again.

The membranes according to the present invention and the membranes produced according to the present invention can be used as a filtration membrane, especially in liquid filtration applications, or as an electrical separator, in which case the membranes used as a separator must not contain any electrically conducting compounds and especially no titanium compounds. The membranes according to the present invention can be used in particular as a separator in batteries, especially as a separator in lithium batteries, preferably lithium high power and high energy batteries. Such lithium batteries may comprise an electrolyte comprising lithium salts having large anions in carbonate solvents. Examples of suitable lithium salts are $LiClO_4$, $LiBF_4$, $LiAsF_6$ or $LiPF_6$, of which $LiPF_6$ is particularly preferred. Examples of organic carbonates useful as solvents are ethylene carbonate, propylene carbonate, dimethyl carbonate, ethyl methyl carbonate or diethyl carbonate or mixtures thereof.

The present invention also provides batteries, especially lithium batteries or related nonaqueous battery systems, comprising a membrane according to the present invention or produced according to the present invention. Owing to the good bendability of the membrane according to the present invention, such batteries, especially lithium batteries, can also be wound cells having a winding radius of less than 0.5 mm for the smallest coil. The membrane according to the present invention now makes it possible to use ceramic or semiceramic membranes as separators in very tightly wound cells, such as crashed batteries for example, and thus to be able to utilize the advantages associated with these separators. Crashed batteries are typically wound battery cells which, after fabrication, are brought by the action of large external forces into a certain, usually oval or at least nonround shape.

The present invention likewise provides filtration apparatuses which comprise a membrane according to the present invention. Such apparatuses can be for example crossflow filtration apparatuses.

The examples which follow describe the present invention without the scope of protection conferred by the claims and the description being restricted by the examples.

EXAMPLES

Reference Example

Production of a Ceramic Membrane According to Prior Art

To 130 g of water and 15 g of ethanol were initially added 30 g of a 5% by weight aqueous $HNO_3$ solution, 10 g of tetraethoxysilane, 2.5 g of methyltriethoxysilane and 7.5 g of GLYMO Dynasilan. This sol, which was initially stirred for some hours, was then used to suspend 125 g each of the aluminum oxides Martoxid MZS-1 and Martoxid MZS-3. This slip was homogenized with a magnetic stirrer for at least a further 24 h, during which the stirred vessel had to be covered over in order that no solvent loss occurred.

The above slip was then used to coat a 56 cm wide polyamide nonwoven (PA-Vlies, Freudenberg) having a thickness of about 100 μm and a basis weight of about 30 $g/m^2$ in a continuous roll coating process wherein the slip is applied by means of a coating knife to the nonwoven moving at a belt speed of about 30 m/h and by passing through an oven having a length of 1 m and a temperature of 150° C. The end result obtained was a membrane having an average pore size of 450 nm that exhibited very poor adhesion for the ceramic to the nonwoven. After 24 h immersion in water (at room temperature), virtually the entire ceramic had become detached.

Inventive Example 1

Production of a Ceramic Membrane According to Invention

To 130 g of water and 15 g of ethanol were initially added 30 g of a 5% by weight aqueous $HNO_3$ solution, 10 g of tetraethoxysilane, 10 g of AMEO Dynasilan and 10 g of GLYMO Dynasilan (all silanes: Degussa AG). This sol, which was initially stirred for some hours, was then used to suspend 125 g each of the aluminum oxides Martoxid MZS-1 and Martoxid MZS-3 (both oxides from Martinswerk). This slip was then stirred with a magnetic stirrer for at least a further 24 h, during which the stirred vessel had to be covered over in order that no solvent loss occurred.

The above slip was then used to coat a 56 cm wide PA nonwoven (Freudenberg) having a thickness of about 100 μm and a basis weight of about 30 $g/m^2$ in a continuous roll coating process (belt speed about 30 m/h, T=150° C.) as described in the comparative test. The end result obtained was a membrane having an average pore size of 450 nm that exhibited remarkably good adhesion for the ceramic to the nonwoven. After 24 h immersion in water (at room temperature), no detachment of the ceramic was observed. The ceramic itself withstood a treatment with water at 120° C. in a pressure-stable reactor, i.e., is steam sterilizable. The bubble point after the 120° C. steam sterilization is an unchanged 1.7 bar approximately, and water flux is an unchanged 5, 800 l/m² hbar.

The bubble point (BP) is that pressure in bar at which a gas bubble passes through a completely wetted membrane (separator). The bubble point is a measure of the size of the largest pore or defect in a membrane. The smaller the BP, the larger the largest pore or largest defect (hole).

The bubble point was measured by trimming a membrane to a 30 mm diameter size. The trimmed membrane was then immersed in the wetting liquid (completely ion-free water) for at least one day. The membrane thus prepared was installed in an apparatus between a round sintered metal disk having a BP of about 0 bar (measurement without membrane), which serves as a support material, and a silicone rubber seal, the apparatus containing above the membrane a vessel which was open at the top, which had the same cross-section as the membrane and which was filled with 2 cm of completely ion-free water and below the membrane a second vessel which likewise had the same cross-section as the membrane and which was equipped with an air inlet by which compressed air could be passed into the vessel via a pressure reduction valve. The membrane was installed underneath the sintered metal disk, so that the sintered metal disk formed the bottom of the upper vessel and the membrane sealed off the lower vessel. The pressure was then raised in the lower vessel in 0.1 bar increments at half minute intervals between each increase in pressure. After each increase in pressure, the water surface in the upper vessel was observed for about half a minute. As soon as the first small gas bubbles appear at the water surface, the BP pressure is reached and the measurement was discontinued.

Inventive Example 2

Production of a Ceramic Membrane According to Invention

To 130 g of water and 15 g of ethanol were initially added 30 g of a 5% by weight aqueous $HNO_3$ solution, 10 g of tetraethoxysilane, 50 g of MEMO Dynasilan (all silanes: Degussa AG). This sol, which was initially stirred for some hours, was then used to suspend 280 g each of CT1200SG aluminum oxide (AlCoA). This slip was homogenized with a magnetic stirrer for at least a further 24 h, during which the stirred vessel had to be covered over in order that no solvent loss occurred.

The above slip was then used to coat a 56 cm wide PA nonwoven (Freudenberg) having a thickness of about 100 µm and a basis weight of about 30 g/m² using a knifecoating applicator. The still moist membrane was then predried with hot air at 80° C. for 5 min and the still slightly moist membrane was then treated for 1 h with a mercury vapor lamp at a wavelength of 254 nm. The membrane was then supplementarily solidified at 210° C. for 30 min. The end result obtained was a membrane having an average pore size of 240 nm that exhibited remarkably good adhesion for the ceramic to the nonwoven. After 24 h immersion in water (at room temperature), no detachment of the ceramic was observed. The ceramic itself withstood a treatment with water at 120° C. in a pressure-stable reactor, i.e., is steam sterilizable. The bubble point after steam sterilization at 120° C. remained an unchanged 3.5 bar approximately, and water flux was unchanged at 2, 100 l/m² hbar.

What is claimed is:

1. A lithium battery, comprising:
a membrane which comprises:
a polymeric nonwoven comprising a ceramic coating both on and in the polymeric nonwoven;
wherein the ceramic coating comprises at least two fractions of oxides selected from the group consisting of $Al_2O_3$, $ZrO_2$, $TiO_2$, and $SiO_2$, a first ceramic fraction obtained from a sol, and a second ceramic fraction comprising particles having an average particle size in the range of from 200 nm to 5 µm, wherein the ceramic coating comprises from 1 to 30 parts by mass of the first ceramic fraction and from 5 to 94 parts by mass of the second ceramic fraction,
wherein the first ceramic fraction is present as a layer on the particles of the second ceramic fraction,
wherein the second ceramic fraction comprises a silicon network bonded (i) via oxygen atoms to said oxides of the ceramic coating; (ii) via organic radicals to said polymeric nonwoven, and (iii) via at least one carbon chain to a further silicon atom,
wherein the membrane is obtained by a process comprising:
providing the polymeric nonwoven with the ceramic coating by applying a suspension onto and into said polymeric nonwoven and solidifying the suspension to form the ceramic coating on and in said nonwoven by heating one or more times,
wherein said suspension comprises a sol and at least one fraction of oxidic particles selected from the group consisting of oxides of the elements Al, Zr, Ti and Si, and at least two different adhesion promoters which are each based on an alkylalkoxysilane of the general formula I

$$R_x\text{—Si(OR)}_{4-x} \qquad (I)$$

where x=1 or 2 and R=organic radical, the R radicals being the same or different,
wherein both of the adhesion promoters comprise alkyl radicals which at least each comprises a reactive group as a substituent, said reactive group on said alkyl radical of one adhesion promoter said at least one promoter has a reactive group that is capable of reacting under the action of UV light reacting with said reactive group of the other adhesion promoter; and
after the applying, exposing the polymeric nonwoven to UV radiation to form a covalent bond between the different adhesion promoters and to form the ceramic coating.

2. The lithium battery according to claim 1, wherein the first ceramic fraction comprises particles having an average particle size of less than 20 nm, wherein the particles are prepared via a particulate sol.

3. A lithium battery according to claim 1, wherein the first ceramic fraction contains particles or an inorganic network of the ceramic material prepared by a polymeric sol.

4. The lithium battery according to claim 1, wherein the first ceramic fraction has a layer thickness of less than 100 nm on the particles of the second ceramic fraction.

5. The lithium battery according to claim 1, wherein the second ceramic fraction contains particles having a BET surface area of less than 5 m²/g.

6. The lithium battery according to claim 1, wherein the polymeric nonwoven comprises polymeric fibers selected from the group consisting of a polyethylene, a polyacrylonitrile, a polypropylene, a polyamide, a polyester and combinations thereof.

7. The lithium battery according to claim 1, wherein the ceramic coating further comprises a third ceramic fraction comprising particles having an average primary particle size in the range of from 10 nm to 199 nm and said first ceramic fraction is present as a layer on the particles of the second ceramic fraction and the third ceramic fraction.

8. The lithium battery according to claim 7, wherein the third ceramic fraction contains particles having a BET surface area in the range of from 10 to 1000 $m^2/g$.

9. The lithium battery according to claim 7, wherein the third ceramic fraction of the membrane contains particles having an average aggregate or agglomerate size in the range from 1 to 25 µm.

10. The lithium battery according to claim 7, wherein the particles of the third ceramic fraction of the membrane are zirconium oxide and the particles of the second ceramic fraction are aluminum oxide particles and said first ceramic fraction is formed from silicon oxide.

11. The lithium battery according to claim 1, wherein the second ceramic fraction comprises particles having an average primary particle size in the range from 30 nm to 60 nm and said third ceramic fraction comprises particles having an average particle size in the range from 1 to 4 µm and the first ceramic fraction comprises from 10 to 20 parts by mass of the ceramic coating, said second ceramic fraction comprises from 10 to 30 parts by mass of the ceramic coating and said third ceramic fraction comprises from 40 to 70 parts by mass of the ceramic coating.

12. The lithium battery according to claim 1, wherein the membrane is bendable down a radius of 5 mm without defects arising as a result.

13. The lithium battery according to claim 1, wherein the membrane is free of any titanium compounds.

* * * * *